(12) United States Patent
Fielding et al.

(10) Patent No.: US 6,568,823 B1
(45) Date of Patent: May 27, 2003

(54) REMOTE MAINTENANCE / MANIPULATION / REPLACEMENT SYSTEM

(76) Inventors: Allan Fielding, 2 Old Hall Road, Batley, West Yorkshire WF17 0AX (GB); Douglas Peter Burnham, Woodlands, Scotchman Lane, Morley, Leeds, West Yorkshire, LS27 OBX (GB)

( * ) Notice: Subject to any disclaimer, the term of this patent is extended or adjusted under 35 U.S.C. 154(b) by 0 days.

(21) Appl. No.: 09/869,742
(22) PCT Filed: Jan. 5, 2000
(86) PCT No.: PCT/GB00/00002
§ 371 (c)(1), (2), (4) Date: Oct. 3, 2001
(87) PCT Pub. No.: WO00/40897
PCT Pub. Date: Jul. 13, 2000

(30) Foreign Application Priority Data

Jan. 5, 1999 (GB) .............................................. 9900039
Jan. 29, 1999 (GB) .............................................. 9901884

(51) Int. Cl.$^7$ .............................................. F21V 33/00
(52) U.S. Cl. ........................ 362/101; 362/581; 362/375; 362/147; 324/220
(58) Field of Search ................................ 362/580, 581, 362/101, 373, 311, 147, 375; 324/219, 220, 221

(56) References Cited

U.S. PATENT DOCUMENTS

| | | | | |
|---|---|---|---|---|
| 1,909,404 A | * | 5/1933 | Horn | 220/662 |
| 4,139,822 A | * | 2/1979 | Urich et al. | 324/219 |
| 4,231,419 A | | 11/1980 | Gugel | |
| 4,530,568 A | | 7/1985 | Haduch et al. | |
| 6,179,435 B1 | * | 1/2001 | Wilson | 362/147 |

FOREIGN PATENT DOCUMENTS

JP         0230377        7/1987

* cited by examiner

Primary Examiner—Sandra O'Shea
Assistant Examiner—Ali Alavi
(74) Attorney, Agent, or Firm—Michael Best & Friedrich LLP

(57) ABSTRACT

The invention relates to a remote access system designed to make the task of positioning, manipulation and/or maintenance of devices, which are difficult to access or in hostile environments, a much easier operation. The system comprises remote manipulation whereby a device (420), such as a bulb, may be moved from a remote access position (200) along a guide (300) to an enclosure position (100). The enclosure position may, for instance, comprise an area formed in the side wall of a swimming pool, such that, a lens (120) of the enclosure sure (100) is arranged, in use, to have the device (420) to one side of it, and, sealed from the device on the other side of the lens (120), there may be water. By providing an arrangement whereby the device (420) can be remotely positioned, the need for draining a swimming pool for the simple replacement of blown bulbs etc. is avoided.

20 Claims, 7 Drawing Sheets

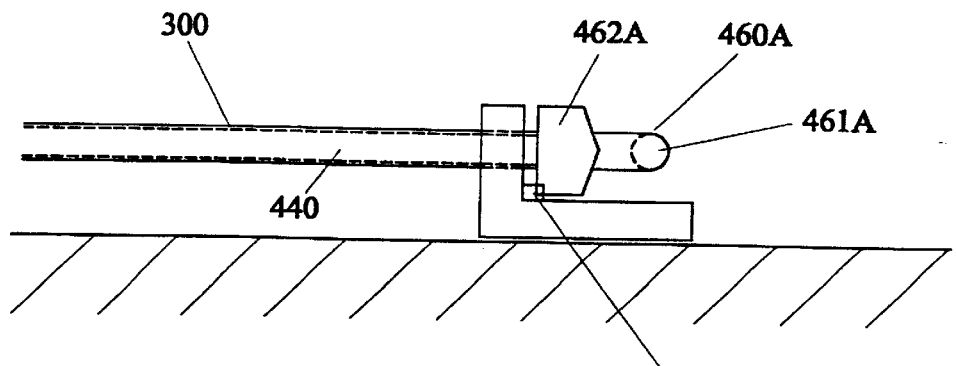
FIG. 2A
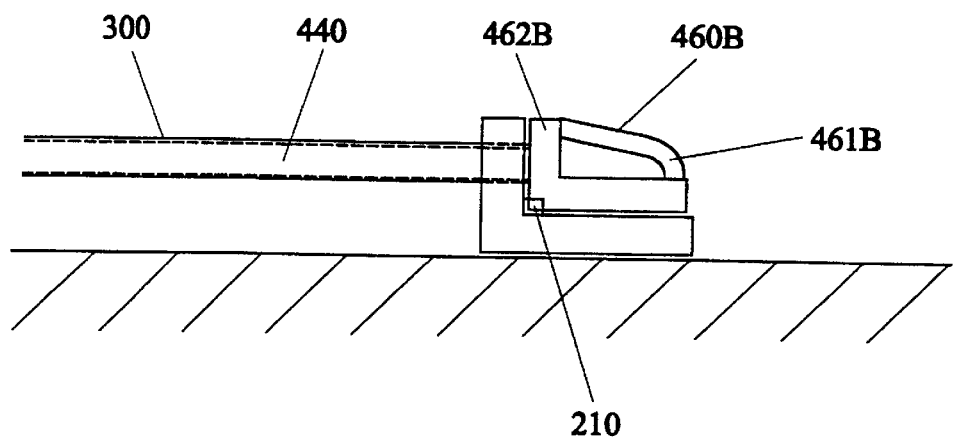
FIG. 2B
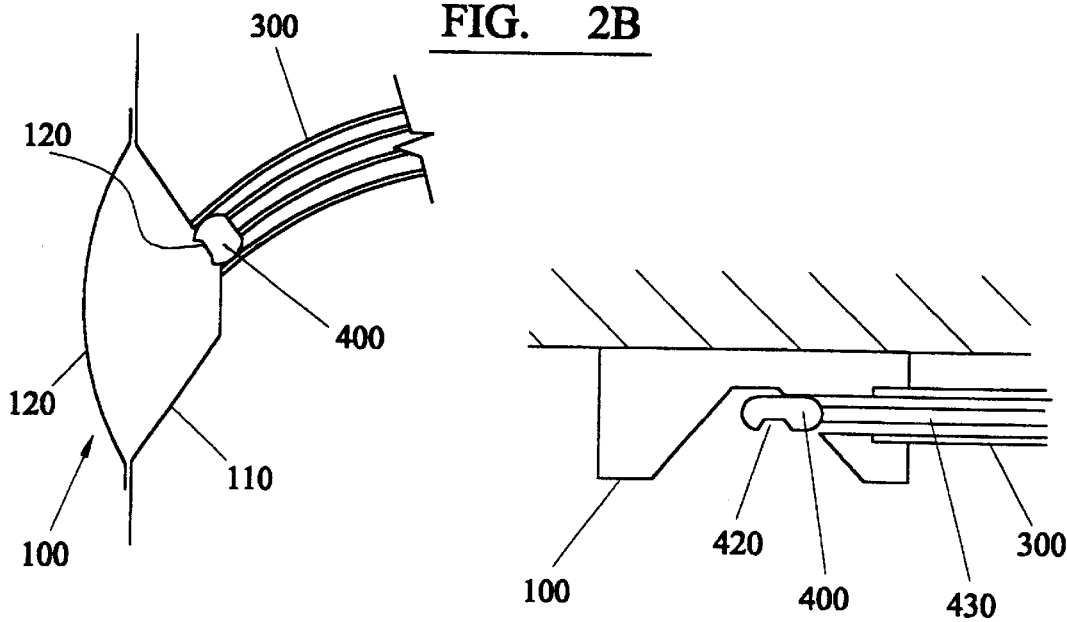
FIG. 6
FIG. 7

REMOTE MAINTENANCE / MANIPULATION / REPLACEMENT SYSTEM

The present invention relates to a remote access system which is designed to make the task of positioning, manipulation or maintenance of devices/fittings, which are difficult to access or in hostile environments, a much easier operation.

Examples of such difficult to access or hostile environments include, for instance, situations where a device monitoring or sounding is in an area which may be under water, inside machines, chemically hostile, sterile, pressurized, an area of bio-technological or medical isolation, a vacuum pressurized area, an area in which particularly high or low temperatures persist, an area of highly inflammable material, or areas in which sources of nuclear radiation are present.

Typical conventional systems require the device/fitting to be replaced or maintained by accessing the old one and replacing with a new one from a direct access position. In hazardous environments, an environmental seal is generally provided between fitting and the environment in question so as to protect that device and isolate it from the hostile environment. To replace items in such types of situation, it is normal to have to break the environmental seal and then reinstate it afterwards. This task might be hazardous, it is certainly time consuming, costly and generally difficult to achieve and in general is undertaken by specialist personnel.

To give a practical example, swimming pool equipment, such as camera maintenance may require partial drainage of the swimming pool before the changing of a fitting in a side wall can occur. Particular embodiments of swimming pool camera may include a removable portion (or "guts assembly") which needs to be removed and brought to the surface before replacement/maintenance proper can begin.

According to an aspect of the invention, there is provided remote access system for access to a device, the system comprising:
- an enclosure in which, in use, the device is positioned;
- a remote access point at which point maintenance/replacement operations are to be carried out; and
- a guide means;
- wherein the guide means has first and second ends, the first end being connected to the enclosure and the second end being connected to the remote access point, the guide means being arranged to guide the device from the enclosure to the remote access point and vice versa during maintenance/replacement operations and to surround a peripheral area of the device during transit.

Preferably, manipulation means are provided by means of which the device is moved from the enclosure to the remote access point and vice versa. The manipulation means may comprise an elongate flexible member having a first end connected to the device and a second end by means of which movement from the enclosure to the remote access point and vice versa is effected.

BACKGROUND OF THE INVENTION

The first end of the manipulation means may comprise a device holder.

The manipulation means may comprise a conduit in which communication means are arranged to run and convey information from the remote access point to the device. The first end of the manipulation means is preferably in mechanical contact with the device.

The manipulation means may include connection means at or adjacent to the second end for conveying information and/or power between the device and one or more external devices. Connection between the connection means and the external device may be achieved by a plug and socket arrangement. Examples of external devices include power sources, data recorders, video signal receivers or other means.

The manipulation means may include a handle, or other grip arrangement at or adjacent to the second end, by means of which movement of the manipulation means within the guide means is effected. This handle/grip arrangement may include the connection means such that grasping of the handle/grip and movement of it in a predetermined direction causes disconnection of the external device from the device. The handle of the manipulation means may be arranged to positively locate with a handle location means when the device is in position within the enclosure.

Preferably, when carrying out a maintenance/replacement operation, the second end of the manipulation means is grasped and moved in a direction for disconnecting, further movement in the direction of disconnecting being arranged to move the device from the enclosure to the remote access point.

The manipulation means may include means for isolating the device from the external device such as by including an integral on/off switch.

The manipulation means may include means for protecting the device during movement. This means for protecting may comprise means for receiving the device and for preventing the device from contacting with the guide means during movement.

The means for protecting may comprise an enlarged device holder, the holder having an outer dimension and form such that during movement between the remote access point and the enclosure, the device is prevented from coming into contact with the guide means.

The protecting means may alternatively comprise a retractable shield. The shield may automatically retract when the device is at the enclosure. The device may be a bulb or may comprise multiple bulbs.

The shield may form part of the manipulation means and, particularly, may comprise a shroud adjacent the device holder, said shroud being capable of relative forward/back movement with respect to the device, when the device is at the enclosure. Such relative forward/back movement may be arranged, where the device is a bulb, to alter a beam pattern of the bulb.

The enclosure may be a housing for a lighting source and the device holder is preferably a bulb holder. The enclosure may include one or more of the following elements: a reflector, for directing light out of the enclosure, a screen and/or a housing for interconnecting reflector and screen. The screen may comprise a transparent lens.

The screen may comprise a pair of lenses, separated from each other by an insulating medium. The insulating medium may be air for instance.

By providing an air gap between the two lenses, excess heat in an external environment is inhibited from being transmitted towards a bulb of the system.

The reflector of the enclosure may be water cooled. Water cooling of the reflector may be achieved by allowing a peripheral portion of the reflector to extend beyond the screen and contact with an external atmosphere, with that external atmosphere being water.

In an alternative arrangement, sealing means may be provided for sealing the device holder to a rear portion of the reflector and means may be provided for allowing water to flow from an exterior environment, to a rear face of the reflector so as to directly cool that reflector by conduction, the system being arranged such that the area around the device is sealed from the external atmosphere.

In a preferred embodiment, a sealing means is provided for forming at least a partial seal between an outer part of the device holder and an inner wall of the guide means. The device holder is preferably arranged to be connected to a gas-tight conduit in which communication leads are conveyed to the device from source/receiver.

Movement of the device between the remote access point to the enclosure may be brought about, for instance where this is difficult to achieve by manual means, by feeding air or other gas under pressure to one side of the device holder to cause movement of the device under a piston-like action within the guide means, whereby the guide means acts as a bore in which the device may be moved. Preferably, gas is fed under pressure into the guide means from the remote access point so that the sealing means in combination with the device holder acts as a piston, with the gas being fed to one side of the device holder via a first passage defined between the exterior of the gas-tight conduit and the interior of the guide means. Preferably, gases on the other side of the device holder are allowed to escape by providing a second, return, passage through the conduit. The return passage may comprise one or more apertures provided in the device holder which give access from the other side of the device holder to the interior of the conduit.

Movement of the device in one direction, preferably towards the enclosure, may be achieved under gas pressure and movement in the other direction may be achieved by manual manipulation means. The manual manipulation means may comprise, for instance, grasping the trailing communication means and pulling the device toward the remote access point, grasping a special cord mechanism or pulling the device by means of a suitable conduit surrounding the communication leads.

Instead of air or gas under a positive pressure being applied to the device, it will be appreciated that providing a source of vacuum (or negative pressure) may be applied to move the device by a suction type effect.

SUMMARY OF THE INVENTION

According to a second aspect of the invention, there is provided the system for propelling a device between a remote access point and an enclosure, the system comprising:

a bore, forming a guide means for the device;

a piston for travelling within the bore and arranged to carry the device;

a source of gas pressure for application to a first side of the piston and propelling the piston within the bore between the remote insertion point and the enclosure; and venting means for gases from a second side of the piston.

Preferably, the device is situated on the second side of the piston.

The source of gas pressure is preferably a source of positive gas pressure and arranged to pressurize a first passageway between the remote access position and the enclosure to cause the piston to move towards the enclosure during a device insertion operation, in which case, the venting means are arranged so as to allow gases from the second side of the piston to escape. If the device is in a non-hazardous environment then exhaust gas may be vented to atmosphere through the enclosure which may not even need a screen.

In alternative embodiments the source of gas pressure may be a source of negative gas pressure (i.e. a suction or vacuum source) for depressurizing the second side of the piston to cause the piston to move towards the enclosure during a device insertion operation.

Embodiments of the system may utilize a combination of positive and negative gas pressure sources to provide movement in both directions between enclosure and remote access point. Other embodiments may use only one source of gas pressure, the source being switchable between the first and second sides of the piston to provide such two-way movement.

It will be appreciated that in each case, control of the application of gas pressure may be achieved by suitable means such as manual or electrically operated valves.

It will also be evident that positive/negative pressure sources correspond to blowing/sucking operations and that movement in each required direction may be achieved by other sources of blowing/sucking, such as an electric motor driven air/gas pump or fan whose direction of rotation may be reversible. Reversing direction of rotation may be achieved by switching means, for instance, by reversing an electrical polarity of the electrical motors supply.

The venting means may comprise a second passageway may connect the second side of the piston with a gas expelling point. The expelling point may be the remote access position. The second passageway preferably forms a return path for gases to the remote access point. The second passageway is preferably formed by a gas tight conduit, a first end of which is mechanically connected to the first side of the piston, and a second end of the conduit may be vented to atmosphere, the first end of the conduit further communicating with the first side of the piston by means of one or more through holes formed in the piston. Gas from the first end of the piston may be expelled to atmosphere via one or more through holes formed in the piston and connecting with the conduit for channelling gases through the conduit. A seal arrangement may be provided between an outer surface of the conduit and the remote access position. Such a seal arrangement may incorporate an entry or exit point for the gas pressure source.

The conduit may also carry communication leads to the device.

Means for gas cooling of the device of systems of the first or second aspect may be provided. The cooling gas may utilise the guide means and may utilise the conduit as a return route, or be expelled to atmosphere via a vent or through the enclosure.

A gas by-pass passage may be utilised in certain systems to facilitate gas cooling and by-pass a seal formed around the device holder, when the device holder is in position.

Orientation means may be provided for changing a position of the device within the enclosure. The orientation means may comprise an eyeball/socket arrangement in which the device forms the "eyeball". Motor means may be provided as part of the orientation means for changing the position of the device. Alternatively, the device may be positioned by the manipulation means. The system may include a bracket for attaching the enclosure to a supporting surface. The orientation means may be associated with the bracket.

The system of the second aspect may include any one or more features of the system of the first aspect in any logical combination and vice versa.

BRIEF DESCRIPTION OF THE DRAWINGS

For a better understanding of the invention, preferred embodiments of the invention will now be described, by way of example only, with reference to the accompanying drawings, in which:

FIGS. 2A and 2B show details of a manipulation means of the system of FIG. 1;

FIGS. 6 and 7 show respectively embodiments of a system with and without a screen;

DETAILED DESCRIPTION

Figure 1:
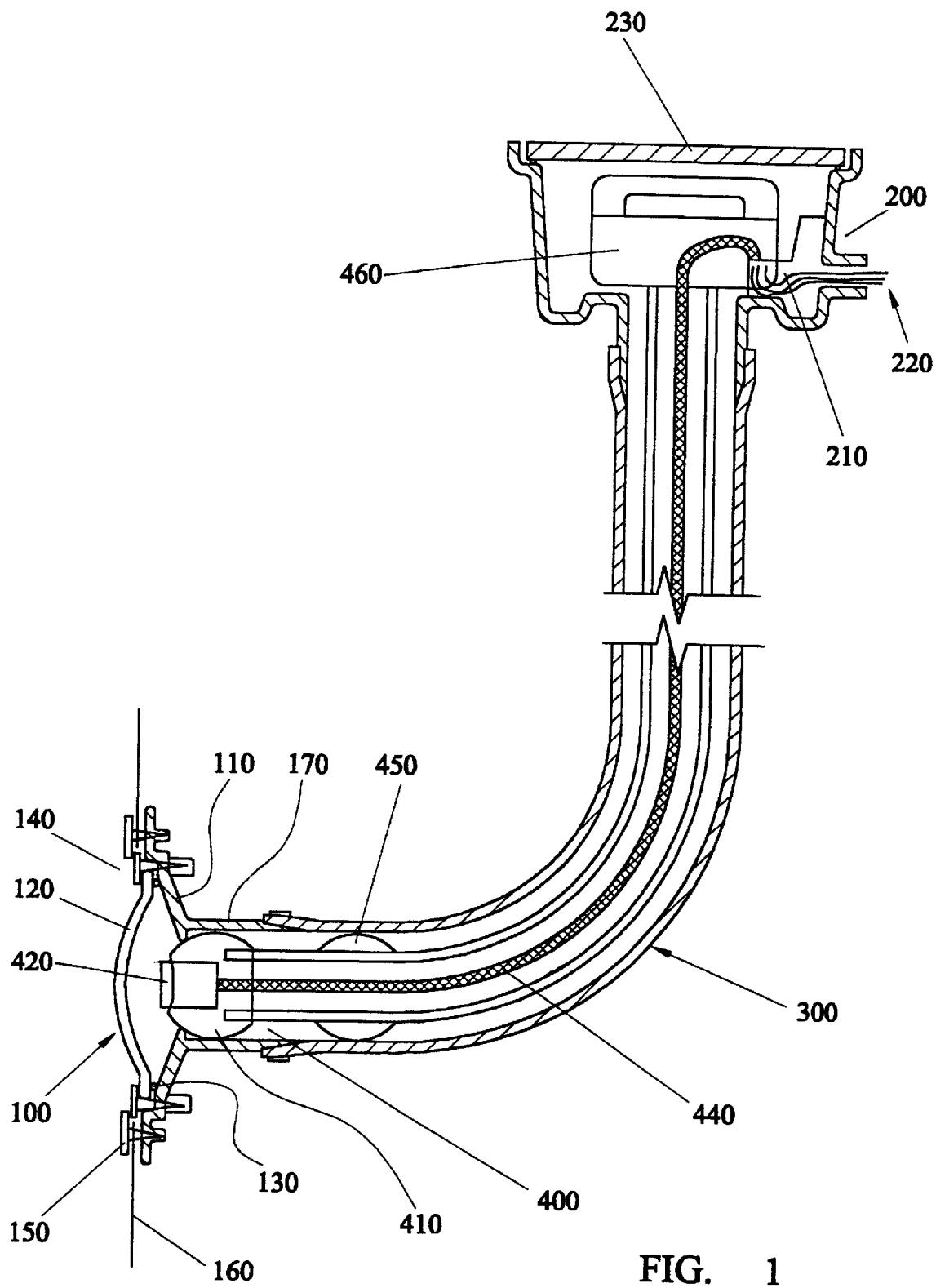
FIG. 1 is a schematic cross-sectional view showing a first embodiment of a system in accordance with the present invention.

Referring to FIG. 1, a first embodiment of the present invention will now be described.

In FIG. 1, there is shown generally, an enclosure 100, a remote access point 200, a guide means 300 and a removable device assembly 400.

The enclosure 100 comprises a housing 110, a screen 120, an environmental seal 130, screws or bolts 140 for connecting the screen 120 to the housing 110 and pinching between them the environmental seal 130 and mounting means 150 for connecting the enclosure 100 to a surface 160 on which the enclosure 100 is to be mounted/recessed into. The housing 110 further includes a device receiving socket 170 for the reception of a device holder 410 which acts both to hold and protect the device 420. The device holder 410 is arranged also to provide connection between leads 430 and the device 420. The communication leads 430 are carried in a flexible conduit 440 from the device holder 410 to the remote access point 200. An exterior of the flexible conduit 440 may be provided with one or more guide buffers 450 for aiding passage of the device through the guide 300, the guide buffer(s) 450 also aid alignment of the assembly 400 with the housing 110. At the other end of the conduit 440 remote from the device 420, there is situated a handle 460 which cooperates with a handle location means 210 provided at the remote location 200. The handle location means 210 as will be described later, preferably includes contact means for connecting communication leads 430 inside the conduit 440 with an external source/receiver 220. The remote location preferably also includes a cover 230 which may be recessed into a mounting surface at the remote location, and may be lockable in position so as to prevent unauthorised access to the handle 460.

Referring now in more detail to FIGS. 2A and 2B, there are shown different handle arrangements 460A and 460B.

Handle 460A of FIG. 2A includes a hand grip portion 461A, a body portion 462A which links with an end of the conduit 440 (shown dashed). A handle 460A cooperates with the handle location means 210 which is in direct communication with the outer guide means 300, such that when the handle 460A is in its home position, it is positively located with the location means 210 and there may be provided (not shown) means for ensuring that the handle 460A is not inadvertently pulled away from the location means 210.

FIG. 2B shows a different type of handle configuration in which the hand grip 461B is slightly differently positioned with respect to a body part 462B. Otherwise however, the handle 460B is effectively the same as and serves the same function as the handle 460A of FIG. 2A.

Figure 3:
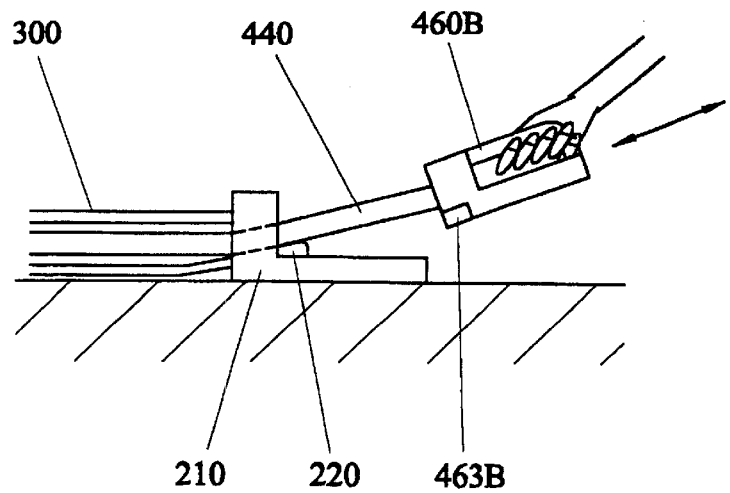
FIG. 3 illustrates how an electrical connector may be included as part of the manipulation means.

Referring to FIG. 3, there is shown a handle of the type 460B in a position where the handle has been withdrawn away from the handle location means 210 to expose a plug and socket arrangement 220/463B formed by complimentary formations on the handle 460B and base station 210. A purpose of the plug/socket arrangement is to connect to the leads 430 carried by the conduit 440. Effectively, the handle location means 210 acts as a surface mounted junction box for connecting an external device (not shown) to the device 420 via the conduit 440.

Examples of device 420 may comprise lighting equipment, cameras (still or video) and microphones to name but a few. Examples of external devices may include power supplies, video recorders and sound data recorders to name but a few.

It will be appreciated that the handle 460A/460B may include latching means for positively locating the handle with the handle location means 210. That latching means may also act as a on/off switch for disconnecting communication to the device 430, as soon as the handle 460A/460B is grasped.

Operation of the apparatus as described in relation to FIGS. 1 to 3, will now be explained. FIG. 1 shows the system in its general in use position. In that configuration, the device 420 communicates by leads 430 via handle 460/460A/460B and location means 210 from an external device situated at a remote location e.g. a power supply or an audio/visual arrangement for instance. The enclosure 100 may, for instance, be located in a hostile environment or a difficult to get to environment, such as the wall of the swimming pool. In this example, the remote access point 200 may be a box recessed into a suitable area of the ground around the swimming pool edge and be protected by a lockable cover 230.

If a device 420 requires replacement or inspection, the lockable cover 230 may be released by a mechanism, key or similar tool, the handle 460 grasped and pulled away such that it pulls clear of the location means 210. Pulling the handle clear of the location means 210 may also sever the connections between the device 420 and the external device by pulling apart the two parts of plug and socket arrangement 220/463B. The conduit 440 is arranged so as to be able to bend, but not to substantially grow in length when manipulated and it may be formed of articulated sections. In this way, when the handle 460 is pulled, the device holder 410 is disengaged from its locating position 170 and pulled backwards into the main part of the guide 300 (which may for instance be of a plastics material). Guide buffers 450 prevent the conduit 440 from snagging within the guide 300 so as to aid its smooth removal. The device holder 410 also acts to protect the device 420 by extending around the outside of the device by a sufficient amount so as to prevent the device from coming into contact with walls of the guide 300. It will be appreciated that by further manipulating the handle the conduit 440 together with device holder 410 and device 420 may be pulled fully clear of the guide 300. At that stage, device 420 may be inspected or replaced if required and any checks on the communication leads made. The device holder 410 complete with the device 420 may then be replaced into the guide 300 and the handle pushed back to its home position on the location means 210, at which point, the device holder 410 will be once again within the device holder receiving portion 170 of the housing 110.

It will be appreciated that with the embodiment as described above, device inspection/replacement and checks on communication leads may be easily carried out without needing to tamper with the environmental seal 130 and, therefore, a safe and convenient means for maintenance is provided in hostile or difficult to get to locations.

Figure 4:
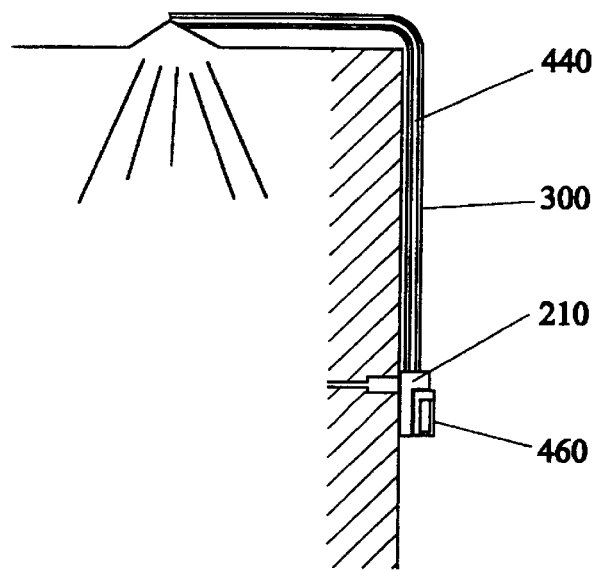
FIG. 4 illustrates a possible application of the system of FIGS. 1 to 3, in an overhead setting.

Referring now to FIG. 4, use of the system shown in FIGS. 1 to 3 is shown in a different environment, whereby the remote handle and the system in general is used for aiding the replacement of ceiling mounted devices. Further description of this drawing will not be made as it is apparent that it is an analogous to the description with regard to FIG. 1.

Figure 5:
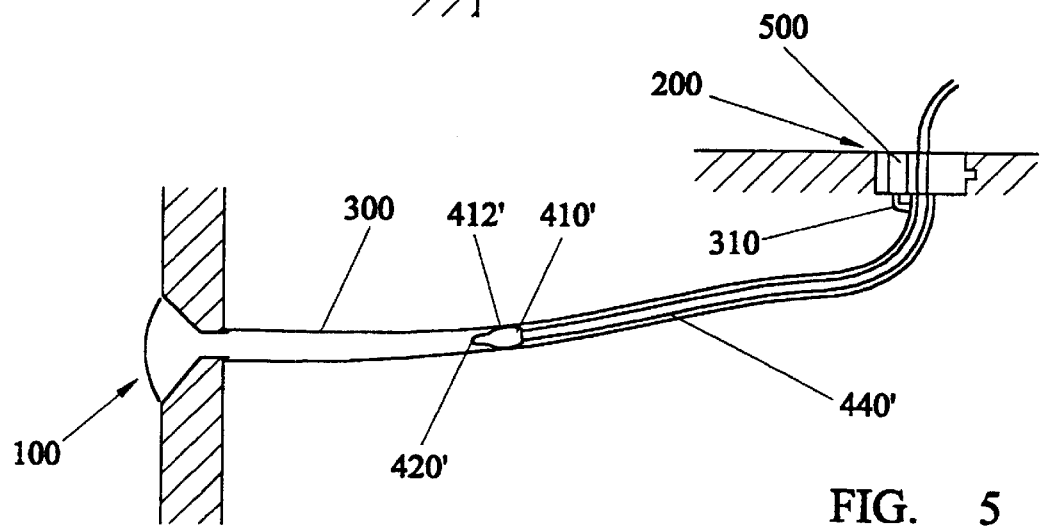
FIG. 5 shows how gas under pressure may be utilized in other embodiments of the system in order to position a device.

Referring now to FIG. 5, there is shown a further embodiment of the invention whereby the handle 460 is not present, but instead, the device may be placed into position and removed by gas under pressure.

Referring in more detail now to FIG. 5, there is shown an enclosure 100 which may be the same as the enclosure 100 of FIG. 1. Similarly, there is provided a guide 300 which again may be of similar formation to the guide 300 shown in FIG. 1. It is important to note however that in this case the guide 300 is acting as a cylinder bore and, therefore, attention needs to be paid to the fact that a transverse cross-section of the guide 300 needs to be maintained substantially constant throughout the length of the guide. The remote position 200 from which device replacement/maintenance operations are carried out is generally similar to the remote location 200. However instead of having the handle location means 210 to which a handle is removable/attachable, there is provided a pressurized gas cylinder or similar 500. Gas may be channelled from the cylinder 500 into the guide 300 by means of an entry passage 310.

The device and its means for connecting with the enclosure 100 is broadly similar to the arrangement shown in FIG. 1. However, in this case the device holder 410' is provided with sealing means 412' which effectively act so as to make the device holder 410' a piston, with the sealing means 412' forming a piston ring. The device holder 410' communicates in the same way as before with a flexible conduit 440' which contains the communication leads for the device 420' and also acts as a return path for air/gas.

Use of the system shown in FIG. 5 will now be described.

It will be appreciated that in the normal use position, device 420' is located within the device enclosure 100 and device holder 410' is within a device holder retaining position similar to the position 170 shown in FIG. 1.

When it is desired to remove the device holder 410' for device replacement or for inspection of the device and/or its associated wiring, etc., the device holder 410' is manipulated so as to shuttle along the guide 300 under gas pressure.

The gas pressure required and procedures involved in transportation of the device holder 410' may be achieved in a number of ways. Firstly, a negative pressure may be applied to the guide 300, between the inner wall of that guide 300 and the outer wall of conduit 440' to suck the device holder 410' backwards along guide 300 under vacuum type conditions. To maintain this suction and avoid it being counteracted by a vacuum being formed on the device side of the holder 410', through holes are formed in the device holder connection with the conduit interior. If the free end of the conduit 440' is open to atmosphere then air can be drawn in to the conduit 440' to the device side of the bulb holder 410' which eases movement of the device holder 410' under suction towards the remote position 200. To transport the bulb holder 410 back to the enclosure 100 from the remote access point the source of suction may be replaced by a source of positive (blowing) gas pressure such as a gas cylinder to blow the device holder 410' along the guide 300.

Where separate suction/blowing sources are used, they may be selectively connected to the guide 300 via passage 310 by suitable switching means such as solenoid valves. On the other hand, it will be appreciated that the suction source/blowing source may be one and the same and be brought about by driving an electric fan in one direction to suck and reversing it to blow.

When it is desired to use a single source of pressurized gas or air to propel the device holder 410' in either direction, solenoid valve switching may be used to change the path of the gas according to a desired direction of movement and it will be appreciated that such switching arrangements whilst not illustrated may be considered to be within the capability of the ordinary man skilled in the art.

It would be evident to a man skilled in the art that a combination of gas pressure and mechanical means may be used to position and remove a device. For instance, a hybrid system may be used in which gas pressure is utilised to position the device in the enclosure but a mechanical withdrawal means is used to pull the source back out to the remote access position. The mechanical withdrawal means may comprise grasping the communication leads to pull the device out or a special cord could be used. In such cases, there is no need for reversal of gas pressure or switching of gas paths. Indeed, in embodiments where no environmental seal is required or where no screen is needed, the gas pressure used to propel the device to the enclosure may be simply vented to atmosphere at the enclosure.

To illustrate the above techniques, FIGS. 6 and 7 are referred to.

In FIG. 6 there is shown an enclosure 100 (with no environmental seal), a guide 300, a device 420, device holder 410 (acting as a piston) and a flexible conduit 430 which includes communication leads 440. A gas pressure source (not shown) may be used to position the device holder 410 correctly in the enclosure 100 with exhaust gases venting to atmosphere around the edges of the screen 120. To withdraw the device and holder, a user may pour the holder 410 by grasping the flexible conduit 430.

In FIG. 7, the same techniques as mentioned in relation to FIG. 6 apply, but in this case no screen 120 is required with exhaust gases going straight to atmosphere during movement of the device 420 and holder 410 toward the enclosure 100.

It will be appreciated from the above that various different modifications may be made to embodiments of the present invention whilst still being within the scope of the present invention. For instance, gas cooling of the device 420 of FIG. 1 may be achieved by providing a path for a cooling gas to be routed from the remote location 200 to the enclosure 100 and then returned. Such a gas path may be provided by an arrangement similar to that of FIG. 5 in which a gas may be propelled down the gap between guide 300 and conduit 440 and then returned through apertures formed in the device holder so as to be routed back inside the conduit 440 and back out to atmosphere.

Figure 8:
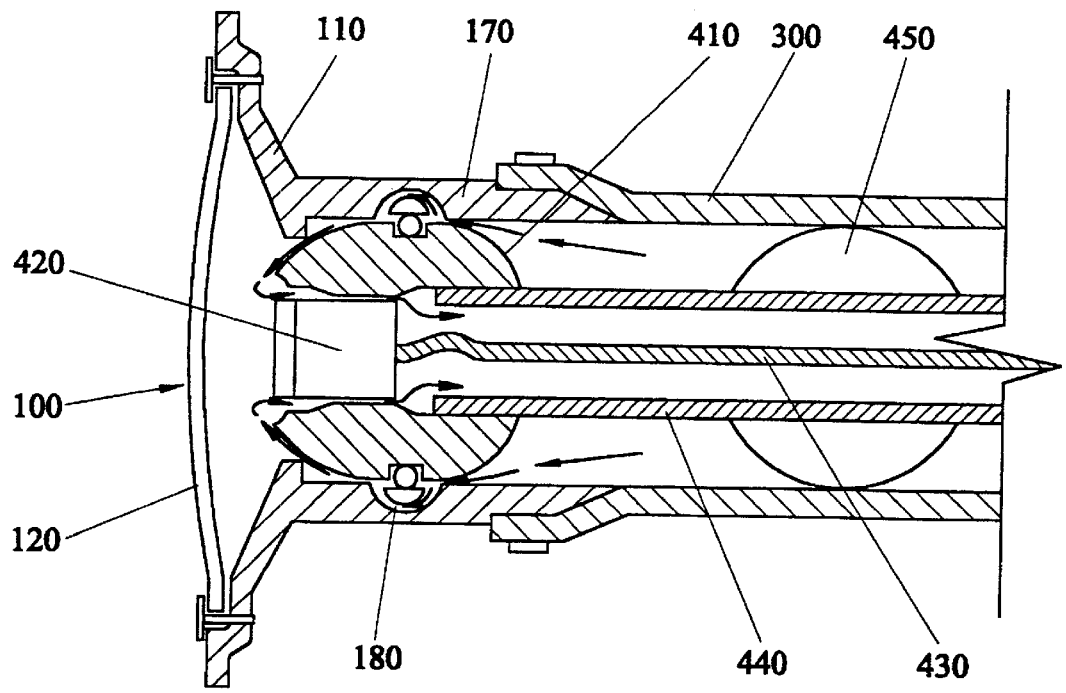
FIG. 8 shows detail of a gas cooling arrangement.

Another means by which gas cooling is achievable is shown in FIG. 8.

In FIG. 8, there is shown a housing 110, device 420, device holder 410, device holder receiving socket 170, guide 300, flexible conduit 430 and communication leads 440 being carried inside the flexible conduit 430 in the manner previously described. FIG. 8 further includes a gas by-pass passage 180 at the device receiving position 170.

In the arrangement of FIG. 8, propelling of the device 420 with holder 410 toward the enclosure 100 is carried out by using a gas pressure source as previously described with reference to FIG. 5. However, once the device holder 410 has achieved the position shown in FIG. 8, gases which were used to propel the holder 410 along the guide 300 continue to be fed along the guide 300 and pass around the device holder 410 by being routed through by-pass passages 180. Having passed through passages 180, the gases may be fed back to the remote position by passing around the device 420 and being channelled back through the holder into the flexible conduit 430. In this manner, a gas cooling system is provided for cooling the device 420 and that the gas cooling system may be seen to operate in conjunction with the gas propelling system. It will be evident that other variations on this type of system are possible, for instance, instead of returning gases to the remote position via a flexible conduit 430, they may be passed around the device 420 and expelled to atmosphere from gaps between the screen 120 and the supporting surface 160 to which it is attached.

The remote access system may allow designers to incorporate more user friendly arrangements which would not only make it easier for device.replacement and maintenance, but could assist them in developing new products which are better in overall design.

The system features a housing which could be built into walls, roofs, ceilings, floor structures, etc., and incorporate a screen with an environmental seal dependent upon the application.

It will be appreciated that materials used may vary dependent upon the application of the system. Adaptation to the system could cater for extra long conduit lengths where the device and junction box are some distance from each other.

It will be appreciated that in the embodiment shown in FIG. 5, a much less substantial inner conduit could be utilized, with the possibility of using standard conductor flex. If a heat sensitive device is required, gas cooling can be achieved using the conduit as a flow and return. The outer guide 300 can be connected to suitable junction box and the housing by various different types of method dependent upon the application. In otherwords, there could be a simple sleeve arrangement, or threaded method. Communication means could of course vary dependent upon the application, for instance. Co-axial cable could be used.

Figure 9:
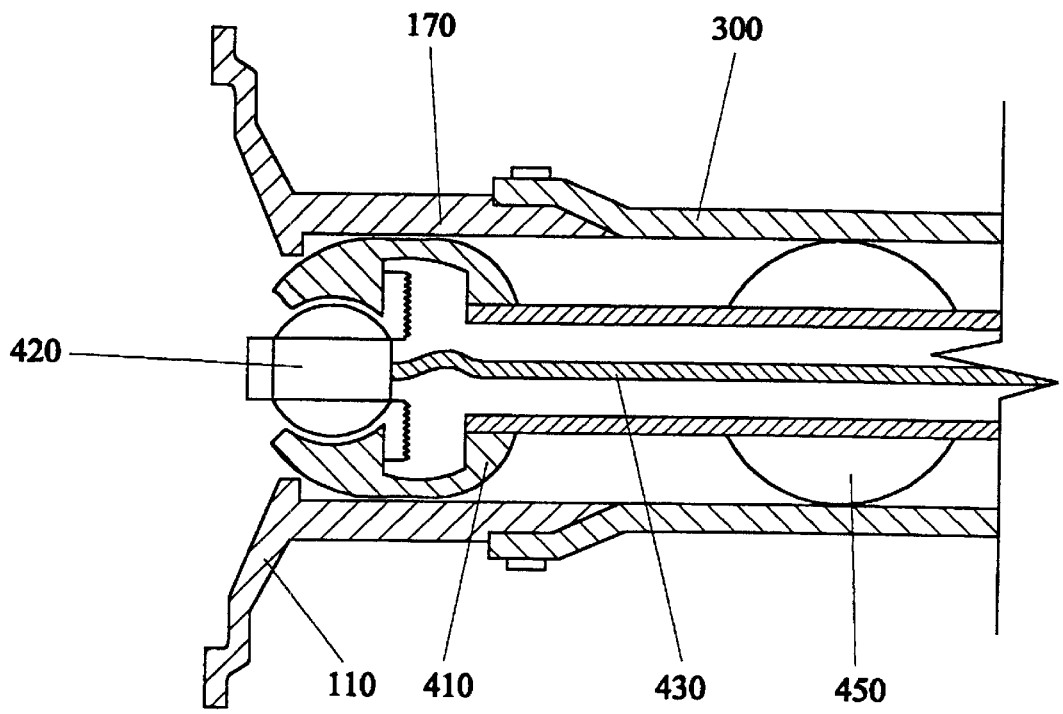
FIG. 9 shows an embodiment in which the device may have its orientation varied.

FIG. 9 illustrates how a device such as a camera could be utilized in accordance with embodiments of the invention and further manipulated whilst in position to change camera orientation.

In the Figure the camera 420 has an eyeball and socket arrangement such that the camera 420 forms the eyeball and the holder 410 forms the socket. There may be provided an electrical actuator for remotely moving the eyeball in the socket by means of an electrical mechanism (not shown) Also, it will be understood that the manipulation means could, itself, include means for moving the camera 420 within the socket, for instance, by rotation of an external handle.

Figure 10:
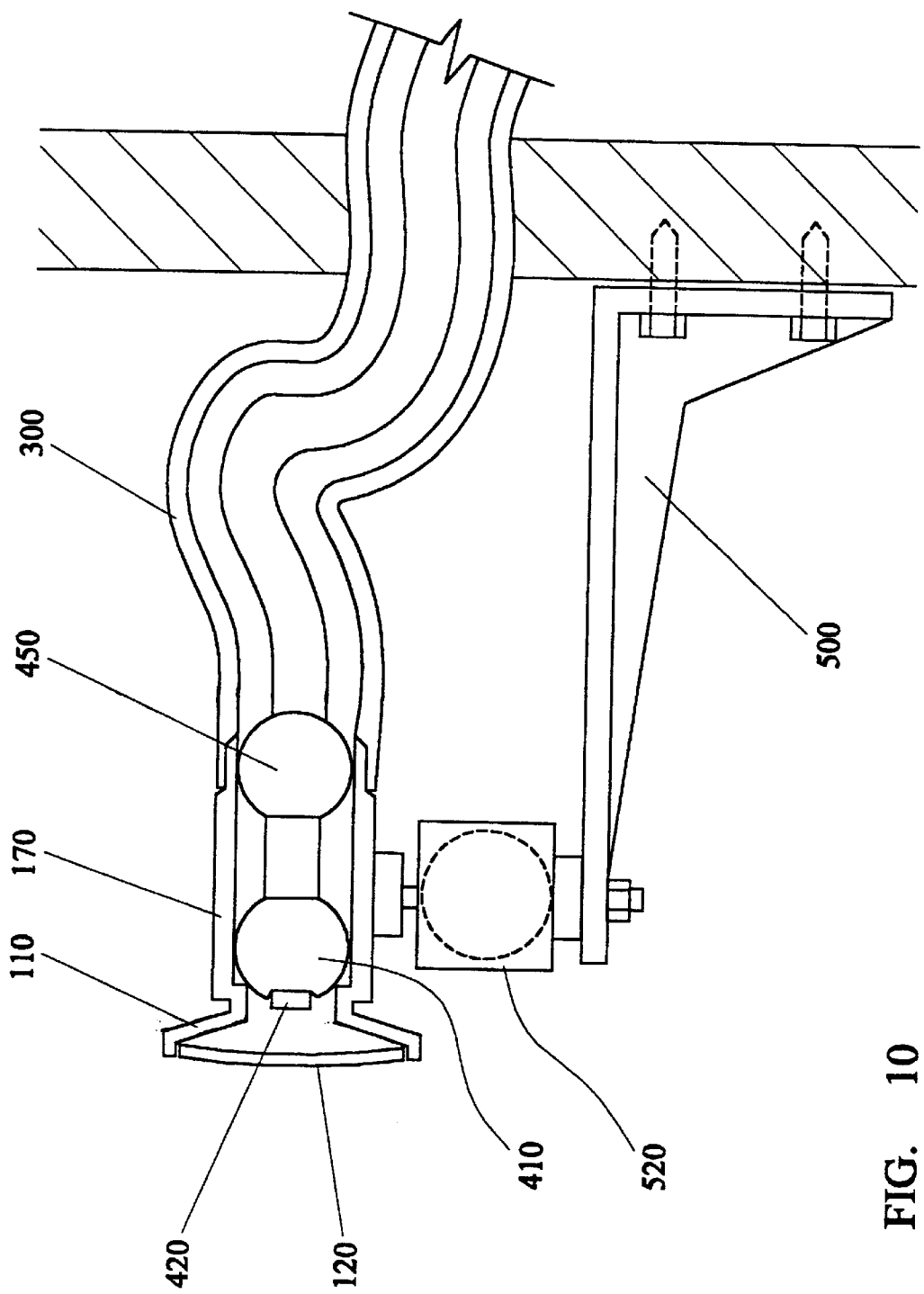
FIG. 10 shows an embodiment of the system having a bracket mounting.

FIG. 10 shows a similar arrangement in which, instead of there being provided a housing integral with a wall or other supporting member, the system is bracket mounted on bracket 500. There may be provided a motorized arrangement 520 between the bracket 500 and the housing 110 so as to allow a device, such as a camera 420, to have its position altered.

Figure 11:
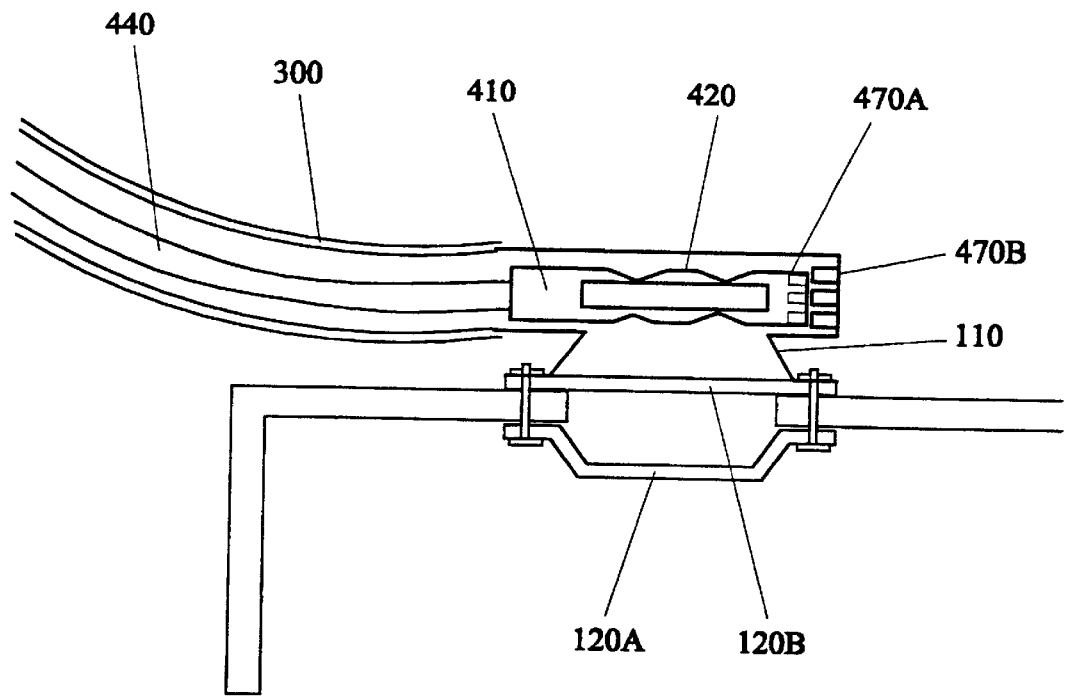
FIG. 11 shows an arrangement in which there is provided a double screen.

FIG. 11 shows an arrangement in which there is provided a double screen, i.e. double lens, arrangement in which there are provided a pair of lenses 120A, 120B associated with the enclosure 110, the two lenses 120A, 120B sandwiching between them a supporting surface to which the enclosure 100 is attached. The two lenses 120A, 120B therefore have an air gap between them which serves to insulate an outer most surface of the lens 120A from heat generated by the device 420. In this way, where the device 420 is a light bulb for use in illuminating an oven interior, heat generated by the oven is largely inhibited from being transmitted to the bulb and its wiring.

Another novel feature of the FIG. 11 arrangement is that the device 420 is provided with a plug type arrangement 470A, for cooperation with a socket type arrangement 470B. This plug and socket arrangement may be used to provide power to the device 420 and to ensure that such power is only provided when the device 420 is fully pushed home so that the plug and socket 470A/470B mates together. In this way, the conduit 440 may simply act as a manipulation means and need not carry any electrical wires itself and, instead, the electrical connections may be provided within the socket 470B mounted at the end of guide 300.

Figure 12A:
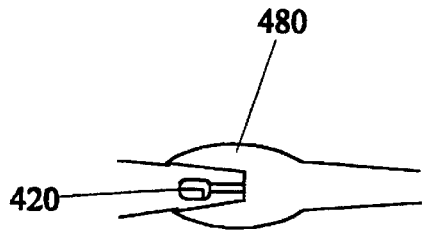
FIG. 12 shows a retractable shroud in a first position (FIG. 12A) and in a second position (FIG. 12B)
Figure 12B:
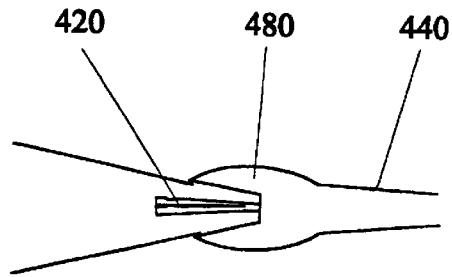

Referring now to FIG. 12, there is shown a retractable shroud in a first position (FIG. 12A) and in a second position (FIG. 12B) with respect to device 420. The shroud 480 is part of the removable device assembly 400 and is arranged such that when the device 420 is securely housed within the enclosure area 100, a small movement of the flexible conduit 440 in a forward or backward direction may be used to alter a beam pattern, where the device 420 is a bulb.

As shown in FIG. 12A, a relative forward position of the shroud 480 acts to effectively shroud a portion of the beam emitted by device 420 to make the beam a narrow beam, whereas a relative backward movement of the shroud 480 (as shown in FIG. 12B) gives a wider beam. Although not shown in FIG. 12A or 12B, it will be appreciated that relative movement of the shroud 480 to the device 420 may be achieved by ensuring that device 420 has a plug/socket arrangement similar to that shown in FIG. 11 so that, when the device 420 is pushed fully home, the plug 470A fits within socket 470B to hold the device 420 in a fixed position, there being further provided a certain amount of slack in the flexible conduit 440 so that the conduit 440 may be manipulated forward or backward without causing the device 420 to be unplugged. This limited forward and backward movement can provide the variation in beam shape.

Figure 13:
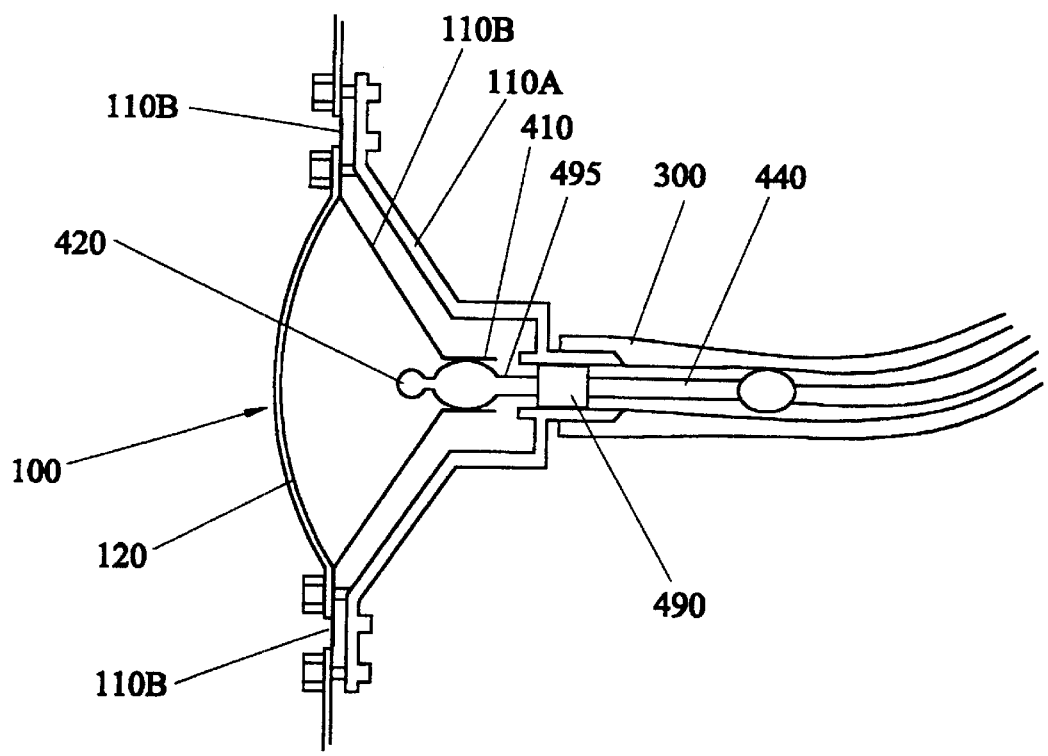
FIG. 13 shows a first arrangement with a water cooled reflector.

FIG. 13 shows an arrangement in which there is an enclosure 110A and a separate reflector 110B. The separate reflector 110B is arranged to have a portion $110B_1$ which is exposed to the atmosphere outside the housing 100. In particular, when the device 420 is a bulb and the area to be illuminated is a swimming pool, the exposed portions 110B$_1$ are exposed to water which can then act as a coolant for cooling the reflector 110B. In the arrangement shown in FIG. 13, the main extent of the reflector 110B is kept dry by having an environmental seal (not shown) preventing water from entering between enclosure area 110A and the reverse side of the reflector 110B. In other words, this situation might be referred to as a "dry reflector" situation.

Figure 14:
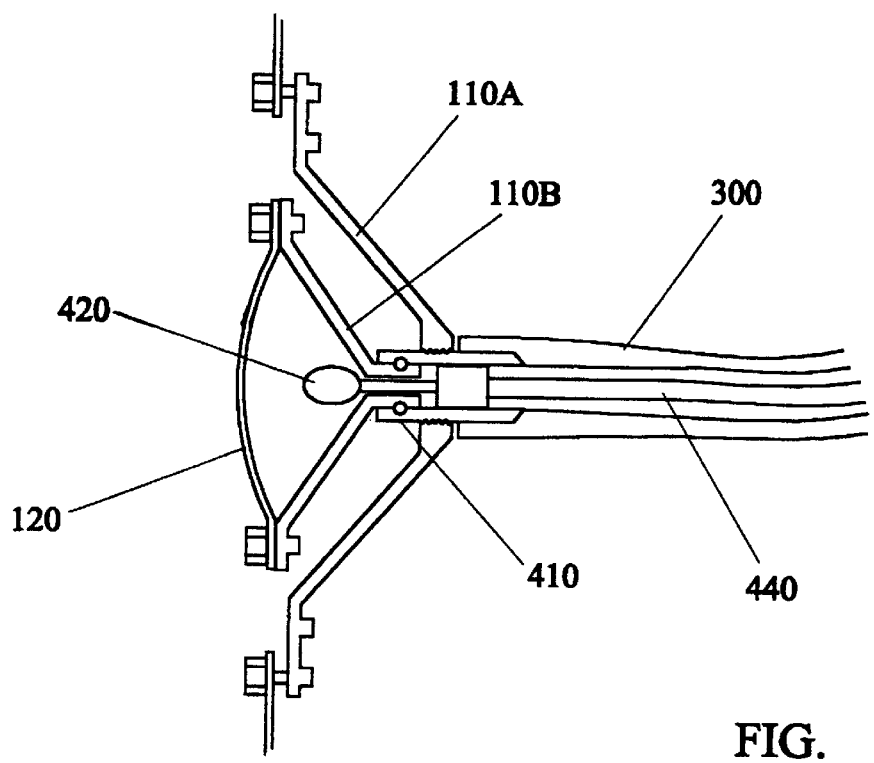
FIG. 14 shows a second arrangement with a water cooled reflector.

In contrast, there is shown a further arrangement in FIG. 14 in which the reflector 110B is separate from a main extent of the enclosure 110A and in which the device holder 410 also acts as a seal to prevent water ingress into the guide 300 or into the actual device area 420. However, the rear side of the reflector 110B is in direct contact with the external atmosphere which, again, may be a swimming pool environment so as to enable direct water cooling of the reflector 110B via it's rear surface. The situation shown in FIG. 14 can be referred to as a "wet reflector" situation.

Such reflector cooling along the principles of FIGS. 13 and 14 may also be applied to arrangements falling outside the scope of claim 1 of this application.

One other point to note from FIG. 13 is the fact that the flexible conduit 440 is arranged to effectively terminate at an end stop position 490 with the power supply leads to the device 420 being linked to the device holder 410 by a thermally insulating shroud 495 which acts as a thermal break so as to prevent excess heat generated at the reflector 110B from being transmitted back toward the guide 300.

Other variations include the possibility that the device holder 410' be "cordless" and has a connector for connecting in a plug/socket manner in the enclosure, so that power connection is only effected when the device holder is in position. It will equally be appreciated that a gas/cooling path could be provided from the enclosure side of the device back to the remote access point or be independently provided.

In a large part of the above disclosure, it will be appreciated that the device in question is typically a bulb/bulb holder which may be in a location which would normally be difficult to access but which, by means of the embodiments disclosed, may be accessed remotely for inspection/replacement.

Apart from the options already discussed with regard to the device/device holder, it will be appreciated that the device may be of a throw-away nature.

Other variations within the capabilities of the man skilled in the art concern the remote access point. Where in the figures plug and socket arrangements have been shown for providing switching of power sources etc., it will also be appreciated that other types of switching operation may occur using, for instance, infrared or radio wave means to control switching which may turn the device on or off etc.

In another variation, the device holder itself may include some movement capability. For instance, the device holder 410 of FIG. 1 could include some motorised means for providing a movement function so as to change the orientation of the device once at the enclosure. For instance, where the device is a bulb, a motor could be incorporated within the bulb holder or associated with the bulb holder to point the bulb in a given direction or to focus a light pattern of the bulb. In other variations, the device holder could include a motor to help to propel the device holder towards the enclosure for instance using small wheels or rollers bearing upon the guide so as to drive the bulb holder securely into position.

It will be appreciated that the device holder 410 may be a bulb holder which is a multiple unit (i.e. has more than one bulb associated with it). Such a holder may include a shroud which protects the multiple bulbs during passage of the holder along the guide 300 and, once the device holder 410 reaches the enclosure 100, such a shroud may be arranged to automatically open so as to expose the individual bulbs.

It will also be appreciated that there may be provided a more sophisticated enclosure arrangement in which there are provided interconnected compartments or sub-assemblies, each being arranged to receive a light source and there may be envisaged a situation in which multiple individual bulbs may be guided to such compartments using a single guide means and manipulation means.

Where device cooling has been mentioned, it will be appreciated that appropriate cooling may be by any appropriate method, i.e. by convection, conduction or radiation and that where a specific coolant is mentioned, that might be any suitable medium.

Where switching of power is required, although plug and socket arrangements at the remote manipulation end have been discussed, it will also be appreciated that a plug and socket arrangement providing power switching could be provided at the enclosure end instead.

The remote access point, may be referred to as a "deck box" (particularly where the system is being used for under water lighting of swimming pools etc). Such a deck box, it will be appreciated, may have a drain facility to drain away rain water etc.

The enclosure 110, when used in replaceable bulb systems may include a reflector, or a separate reflector may be provided. Further, the screen 120 of the system is typically a lens, that lens being capable of a wide variety of design and, for instance, could be a double thickness type lens with a gap between the two layers to provided for heat insulation.

The guide 300/enclosure 100 may be pressurised.

The device holder 410, as discussed above, may move through the guide 300 under manipulation of the manipulation means, this may be assisted by gravity or by motor drive. Further, the device holder and/or one or more guide buffers 450 may be provided with rollers to assist their movement through the guide 300.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for conveying a light bulb to an enclosure from a remote access point, the system comprising:

an enclosure in which, in use, the light bulb is arranged to function;

a remote access point at which point maintenance/replacement operations are to be carried out; and a guide means;

wherein the guide means has first and second ends, the first end being connected to the enclosure and the second end being connected to the remote access point, the guide means being arranged to guide the light bulb from the enclosure to the remote access point and vice versa during maintenance/replacement operations and to surround peripheral area of the light bulb during transit, the system further comprising manipulation means to move the bulb between the remote access point and the enclosure, the manipulation means having a first end comprising a bulb holder connected to the bulb, a second end comprising a handle by means of which movement of the bulb within the guide means is effected, the system being characterised in that the manipulation means is flexible, being arranged so as to be able to bend to allow it to flex around bends within the guide means, but not to substantially grow in length, such that movement of the handle is arranged to guide the bulb and its holder within the guide means in movement to and from the enclosure and movement of the handle being further arranged such that when the bulb is positioned within the enclosure and the handle is moved so as to initiate withdrawal of the bulb from the enclosure, the bulb is automatically disconnected from a power supply.

2. A system according to claim 1, wherein the manipulation means includes connection means at or adjacent to the second end for conveying power between the bulb and one or more external devices.

3. A system according to claim 2, wherein connection between the connection means and the external device may be achieved by a plug and socket arrangement.

4. A system according to claim 3, wherein the handle comprises the connection means and grasping of the handle and movement of it in a predetermined direction causes disconnection of the external device from the bulb.

5. A system according to claim 4, wherein the handle of the manipulation means is arranged to positively locate with a handle location means when the bulb is in position within the enclosure.

6. A system according to claim 5, wherein the manipulation means includes means for isolating the bulb from the external device by including an integral on/off switch.

7. A system according to claim 1, wherein the manipulation means includes means for protecting the bulb during movement.

8. A system according to claim 7, wherein the means for protecting comprises an enlarged bulb holder, the holder having an outer dimension and form such that during movement between the remote access point and the enclosure, the bulb is prevented from coming into contact with the guide means.

9. A system according to claim 7, wherein the means for protecting comprises a retractable shield, which is arranged to automatically retract when the bulb is at the enclosure.

10. A system according to claim 9, wherein the shield comprises a shroud adjacent the bulb holder, said shroud being capable of relative forward/back movement with respect to the bulb, when the bulb is at the enclosure.

11. A system according to claim 1, wherein the enclosure includes one or more of the following elements: a reflector, for directing light out of the enclosure, a screen and/or a housing for interconnecting reflector and screen.

12. A system according to claim 11, wherein the screen comprises a transparent lens.

13. A system according to claim 12, wherein the screen comprises a pair of lenses, separated from each other by an insulating medium.

14. A system according to claim 11, wherein where the system is utilised to provide lighting to a liquid environment, a reflector associated with the lighting source is at least partially exposed to said environment to provide cooling for said reflector.

15. A system according to claim 14, wherein cooling is provided by extending a peripheral portion of the reflector beyond the screen to contact with said environment.

16. A system according to claim 14, wherein sealing means are provided for sealing the bulb holder to a rear portion of the reflector and means are provided for allowing liquid to flow from an said environment, to a rear face of the reflector so as to directly cool that reflector by conduction, the system being arranged such that the area around the bulb is sealed from said atmosphere.

17. A system according to claim 16, wherein a further sealing means is provided for forming at least a partial seal between an outer part of the bulb holder and an inner wall of the guide means.

18. A system according to claim 1, wherein orientation means are provided for changing a position of the bulb within the enclosure.

19. A system according to claim 18, wherein the orientation means comprises motor means for changing the position of the bulb.

20. A system according to claim 18, wherein the bulb orientation is variable by using the manipulation means.

* * * * *